US006177172B1

(12) United States Patent
Yeager

(10) Patent No.: US 6,177,172 B1
(45) Date of Patent: *Jan. 23, 2001

(54) ZIPPERED FILM AND BAG

(75) Inventor: James W. Yeager, Mobile, AL (US)

(73) Assignee: Innoflex Incorporated, Mobile, AL (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/456,179

(22) Filed: Dec. 7, 1999

Related U.S. Application Data

(63) Continuation of application No. 09/294,957, filed on Apr. 20, 1999, now Pat. No. 6,019,512, which is a continuation of application No. 08/957,304, filed on Oct. 23, 1997, now Pat. No. 5,902,047, which is a continuation of application No. 08/501,900, filed on Aug. 9, 1995, now abandoned, which is a continuation-in-part of application No. 08/275, 281, filed on Jul. 12, 1994, now Pat. No. 5,461,845, which is a continuation of application No. 07/966,427, filed on Oct. 26, 1992, now abandoned.

(51) Int. Cl.[7] .............................. B32B 3/06

(52) U.S. Cl. .............................. 428/101; 428/99; 383/203

(58) Field of Search .............................. 428/99, 101; 383/203

(56) References Cited

U.S. PATENT DOCUMENTS

| | | |
|---|---|---|
| Re. 29,043 | 11/1976 | Naito . |
| 2,807,265 | 9/1957 | Oliva et al. . |
| 2,978,769 | 4/1961 | Harrah . |
| 3,172,443 | 3/1965 | Ausnit . |
| 3,181,583 | 5/1965 | Lingenfelter . |
| 3,266,965 | 8/1966 | Spees . |

(List continued on next page.)

FOREIGN PATENT DOCUMENTS

| | | |
|---|---|---|
| 719570 | 10/1965 | (CA) . |
| 675235 A5 | 9/1990 | (CH) . |
| 424 108 | 11/1996 | (DE) . |
| 452 430 | 5/1968 | (DK) . |
| 0 118 124 | 3/1984 | (EP) . |
| 0 485 741 A1 | 11/1991 | (EP) . |
| 0 528 721 | 8/1992 | (EP) . |
| 528721 | 2/1993 | (EP) . |

(List continued on next page.)

OTHER PUBLICATIONS

*Histories,* Modern Packaging, believed to be Oct., 1953 (2 pages).

*Primary Examiner*—Terrel Morris
*Assistant Examiner*—Arti Singh
(74) *Attorney, Agent, or Firm*—Rockey, Milnamow & Katz, Ltd.

(57) ABSTRACT

Reclosable bags, plastic film for making the bags, and a method and apparatus for making the bags are disclosed. The bag has a reclosable fastener (26) connected to a single wall of the bag, and the film (55) has a reclosable fastener (26) connected to one side thereof which does not require attachment to any other portion of the film (55) when making a bag. The fastener (26) has a tamper-proof member attached thereto to indicate if the bag has been previously opened. The film (55) can be wound into a roll (54) suitable for use on conventional bag making machines including form, fill, and seal machines or a chain of coilable reclosable bags can be produced therefrom since the fasteners (26) are connected to the web preferably transversely to the bags longitudinal formation axis. The method and apparatus for making the film (55) includes supplying a continuous web of bag making material, feeding from a coil of continuous fastener material enough fastener material to make a single fastener, (26) positioning, cutting, and attaching the fastener (26) to the film (55), with a plurality of fasteners (26) attached thereon.

19 Claims, 9 Drawing Sheets

U.S. PATENT DOCUMENTS

| | | |
|---|---|---|
| 3,338,285 | 8/1967 | Jaster . |
| 3,381,592 | 5/1968 | Ravel . |
| 3,405,861 | 10/1968 | Bush . |
| 3,426,959 | 2/1969 | Lemelson . |
| 3,440,696 | 4/1969 | Staller . |
| 3,449,888 | 6/1969 | Gausman . |
| 3,473,589 | 10/1969 | Gotz . |
| 3,532,571 | 10/1970 | Ausnit . |
| 3,543,343 | 12/1970 | Staller et al. . |
| 3,570,375 | 3/1971 | Williams et al. . |
| 3,608,439 | 9/1971 | Ausnit . |
| 3,625,270 | 12/1971 | Skendzic . |
| 3,658,562 | 4/1972 | Wilson . |
| 3,717,244 | 2/1973 | Smith . |
| 3,789,888 | 2/1974 | James et al. . |
| 3,827,472 | 8/1974 | Uramoto . |
| 3,948,705 | 4/1976 | Ausnit . |
| 4,020,884 | 5/1977 | Jadot . |
| 4,046,408 | 9/1977 | Ausnit . |
| 4,094,729 | 6/1978 | Boccia . |
| 4,204,241 | 12/1980 | Sanborn, Jr. . |
| 4,240,241 | 12/1980 | Sanborn, Jr. . |
| 4,241,865 | 12/1980 | Ferrell . |
| 4,246,288 | 1/1981 | Sanborn, Jr. . |
| 4,285,105 | 8/1981 | Kirkpatrick . |
| 4,332,344 | 6/1982 | Strodthoff . |
| 4,335,817 | 6/1982 | Bahr . |
| 4,341,575 | 7/1982 | Herz . |
| 4,354,541 | 10/1982 | Tilman . |
| 4,355,494 | 10/1982 | Tilman . |
| 4,372,793 | 2/1983 | Herz . |
| 4,401,213 | 8/1983 | Lerner . |
| 4,430,070 | 2/1984 | Ausnit . |
| 4,437,293 | 3/1984 | Sanborn, Jr. . |
| 4,449,962 | 5/1984 | Copia . |
| 4,479,244 | 10/1984 | Ausnit . |
| 4,555,282 | 11/1985 | Yano . |
| 4,570,820 | 2/1986 | Murphy . |
| 4,601,694 | 7/1986 | Ausnit . |
| 4,617,683 | 10/1986 | Christoff . |
| 4,619,021 | 10/1986 | Johnson . |
| 4,655,862 | 4/1987 | Christoff et al. . |
| 4,663,915 | 5/1987 | Van Erden . |
| 4,666,536 | 5/1987 | Van Erden . |
| 4,691,373 | 9/1987 | Ausnit . |
| 4,709,398 | 11/1987 | Ausnit . |
| 4,709,399 | 11/1987 | Sanders . |
| 4,709,533 | 12/1987 | Ausnit . |
| 4,756,629 | 7/1988 | Tilman et al. . |
| 4,782,951 | 11/1988 | Griesbach et al. . |
| 4,790,126 | 12/1988 | Boeckmann . |
| 4,817,188 | 3/1989 | Van Ercen . |
| 4,840,611 | 6/1989 | Van Erden . |
| 4,844,759 | 7/1989 | Boeckmann . |
| 4,848,928 | 7/1989 | Ausnit . |
| 4,878,986 | 11/1989 | Nishikawa . |
| 4,878,987 | 11/1989 | Van Erden . |
| 4,892,414 | 1/1990 | Ausnit . |
| 4,894,975 | 1/1990 | Ausnit . |
| 4,896,775 | 1/1990 | Boeckmann et al. . |
| 4,909,017 | 3/1990 | McMahon et al. . |
| 4,915,318 | 4/1990 | Sorensen . |
| 4,925,316 | 5/1990 | Van Erden et al. . |
| 4,956,963 | 9/1980 | Johnson . |
| 4,969,967 | 11/1990 | Sorensen . |
| 4,993,844 | 2/1991 | Robinson et al. . |
| 5,022,530 | 6/1991 | Zieke . |
| 5,024,537 | 6/1991 | Tilman . |
| 5,036,643 | 8/1991 | Bodolay . |
| 5,036,645 | 8/1991 | Schwarz . |
| 5,050,736 | 9/1991 | Griesbach et al. . |
| 5,116,140 | 5/1992 | Hirashima . |
| 5,157,811 | 10/1992 | Bodolay . |
| 5,167,455 | 12/1992 | Forman . |
| 5,167,608 | 12/1992 | Steffens, Jr. et al. . |
| 5,186,543 | 2/1993 | Cochran . |
| 5,188,461 | 2/1993 | Sorensen . |
| 5,601,368 | 2/1997 | Bodolay et al. . |
| 5,774,954 | 7/1998 | Ramsey . |
| 5,806,984 | 9/1998 | Yeager . |
| 5,829,884 | 11/1998 | Yeager . |
| 5,902,047 | 5/1999 | Yeager . |
| 6,044,621 | 4/2000 | Malin et al. . |
| B1 4,894,974 | 12/1991 | Ausnit . |
| B1 4,904,017 | 2/1999 | McMahon et al. . |

FOREIGN PATENT DOCUMENTS

| | | |
|---|---|---|
| 0 776 828 A2 | 6/1997 | (EP) . |
| 0 873 856 A2 | 10/1998 | (EP) . |
| 1 031 136 | 6/1953 | (FR) . |
| 1 079 480 | 11/1955 | (FR) . |
| 1 423 849 | 3/1996 | (FR) . |
| 998697 | 7/1965 | (GB) . |
| 54-392118 | 3/1979 | (JP) . |
| 54-39218 | 3/1979 | (JP) . |
| 60-60447 | 10/1986 | (JP) . |
| 61-232111 | 10/1986 | (JP) . |
| 62-135160 | 6/1987 | (JP) . |

FIG. 6E
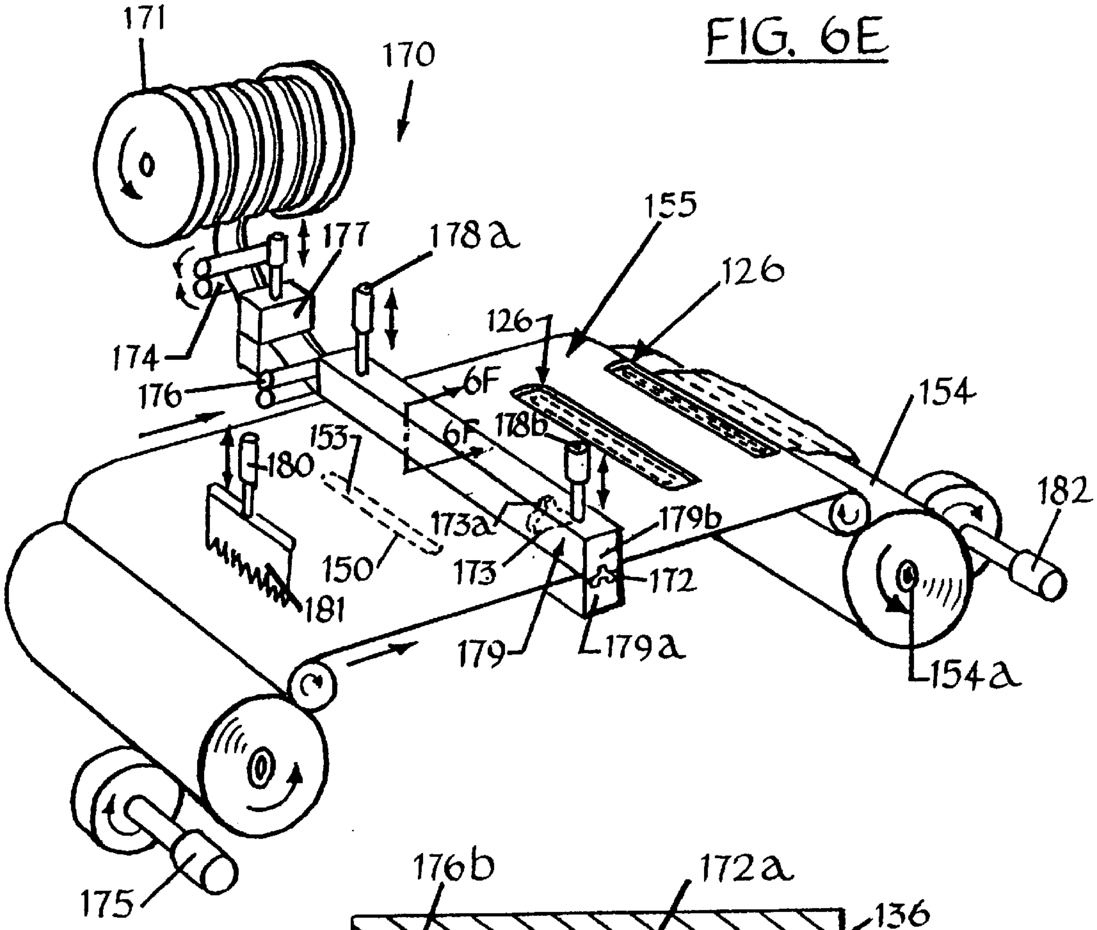
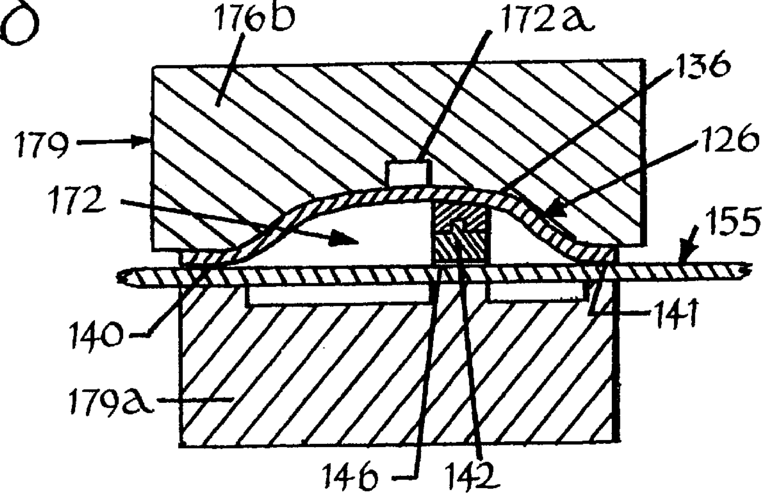
FIG. 6F

ZIPPERED FILM AND BAG

CROSS-REFERENCE TO RELATED APPLICATIONS

This application is a continuation of U.S. application Ser. No. 09/294,957 filed Apr. 20, 1999 now U.S. Pat. No. 6,619,512, which is a continuation of U.S. application Ser. No. 08/957,304 filed Oct. 23, 1997, now U.S. Pat. No. 5,902,047, which is a continuation of U.S. application Ser. No. 08/501,900 filed Aug. 9, 1995, now abandoned, which is a continuation-in-part of U.S. application Ser. No. 08/275,281, filed Jul. 12, 1994, now U.S. Pat. No. 5,461,845, which is a continuation of application Ser. No. 07/966,427 filed Oct. 26, 1992, now abandoned.

TECHNICAL FIELD

The invention relates to reclosable fasteners for attachment to plastic film, plastic film having a reclosable fastener transversly attached thereon, bags made from plastic film having a reclosable fastener attached thereto, and methods and apparatus for making film and bags having reclosable fasteners attached thereto. Even more particularly, the present invention is related to plastic film having a reclosable fastener thereon which may be used (a) in a form, fill, and seal packaging machine to package items in a reclosable bag and (b) to make reclosable bags which may be connected to one another.

BACKGROUND ART

Plastic bags are well known in the art. Such bags may be used for containing a variety of items. A popular use for plastic bags is to contain and display food items such as poultry and the like. Exemplary of the prior art are the following patents:

U.S. Pat. No. 5,116,140 discloses an easy-to-open synthetic resin bag including (a) a bag body substantially composed of a pair of laminated walls made of synthetic resin films, the peripheries of the laminated walls being heat-sealed to form a sealed border region while defining an unsealed storing space within the sealed border region, (b) a tear string which is heat sealed along an imaginary opening line on the inside of one of the laminated walls, the tear string having both ends thereof heat sealed in a sandwiched condition on the corresponding portion of the sealed border region, (c) a pulling tab formed by cutting a part of one side portion of the sealed border region which corresponds to one end of the tear string, the pulling tab being tearable from the bag body integrally with the tear string, and (d) a tear string retaining portion including a transverse opening which is formed by cutting off a part of the other side portion of the sealed border region and a pair of inside and outside heat sealed portions which are located at both sides of the transverse opening, the transverse opening extending in a direction perpendicular to the tear string such that the tear string passes through a central portion of the transverse opening. Due to such a tear string, retaining portion, the separation and complete removal of the tear string from the bag is reliably prevented while assuring the easy bag opening operation.

U.S. Pat. No. 5,050,736 discloses a reclosable package including interlocking closure strips positioned outside of a hermetic seal or seal area and the method for producing same. The hermetic seal is of the easy-open or peelaway type so as to not destroy the integrity of the package or closure strips upon opening of the package.

U.S. Pat. No. 5,036,543 discloses a form, fill, seal and separate packaging machine for reclosable containers to web by a plurality of stations disposed along a path of travel of a thermoplastic web including a device to attach a pair of mated, resealable closure strips to the base web. The machine is intermittent in its operation, with movement of the web through the machine controlled so that the various steps of applying the closure strips, forming, filling, sealing and separating the reclosable containers are performed during periodic stops of the machine. The machine is further characterized by its use of two pairs of web belts to move the web through the machine. A first pair of web belts initially receive the folded web stock and partially form and completely fill the containers. The second pair of web belts overlap with the downstream end of the first pair of belts, but are disposed lower than the first belts. When the filled partially formed containers pass from the first pair of belts to the second pair of belts, the unsealed free ends are exposed for final sealing and severing.

U.S. Pat. No. 5,022,530 discloses a modified zipper elements for easy open containers having interlocking zipper elements and a tear strip for opening the container along the upper edge, wherein the bases of the zipper elements are extended upward towards the tear strip to limit the area of tearing and protect the zipper elements, and a method for making.

U.S. Pat. No. 4,909,017 discloses a reclosable bag material, method and apparatus which is a new method of making a form fill bag having a reclosable fastener thereon and a mechanism therefor wherein a continuous length of film is advanced and joined first and second fastener profile strips are laid laterally onto the film of a length substantially equal to one-half of the film width, the film is advanced and formed into a tube with the side edges folded together and seamed, the first profile strip is attached to the surface of the film prior to forming it into the tube and the second opposed interlocked profile strip is attached to the inner surface of the film after it is formed into a tube, and a cross-seam is formed in the tube above the closure strip to form the bottom of the succeeding bag, and a completed bag is cut from the film by cutting below the bottom seam and above the fastener strips.

U.S. Pat. No. 4,894,975 discloses a method and apparatus for making reclosable bags with fastener strips in a form fill and seal machine from a supply of thin thermoplastic film with the film being formed into tubular shape about a filling tube with the edges of the film brought together and joined solely by a zipper strip having reclosable pressure interlocking members thereon with the zipper strip preferably heat sealed to the film and the zipper strip having a web between the pressure interlocking members which provides a tamper-evident juncture between the edges of the film so that the web must be severed for access to the interior of a bag formed from the film, and individual bags formed from the continuous tube by filing the tube through the filling tube and cross-seaming and cutting individual bags from the continuous film tube.

U.S. Pat. No. 4,782,951 discloses a reclosable package and method of making reclosable package including interlocking closure strips positioned outside of a hermetic seal or seal area and the method for producing same. The hermetic seal is of the easy-open or peelaway type so as to not destroy the integrity of the package or closure strips upon opening of the package.

U.S. Pat. No. 4,617,683 disclosed a reclosable bag, material, and method of and a device for making same wherein in one aspect extruded resiliently flexible plastic profiled reclosable fastener strip device for reclosable bags is located across the longitudinal formation axis of the bag wall web material, and in another aspect of the invention single strip fastener strip has at one or more suitable locations there along separations across the profiles, such as notches, to facilitate bending or folding of the strip upon itself so that the self-interlocking profiles of the portions of the strip folded upon themselves are adapted for reclosable interlocking with one another. The interlockable portions of the strip may have separable air tight sealing ribs therealong. The web and fastener material and fastener assembly is especially suitable for machines wherein the bags are formed, filled and sealed.

U.S. Pat. No. 4,241,865 discloses a reclosable shipping sack and method, the sack having a pouring mouth from which discrete pourable contents may be discharged, including a primary non-reclosable stitched closure fastener across and closing the mouth against unintentional discharge o the contents and including a device such as chain stitch and rip strip for facilitating digital opening of the primary closure fastener. A secondary, reclosable fastener, desirably of the zipper type, extends across the sack mouth outwardly from the primary closure fastener and is adapted for selectively opening and closing the sack mouth after opening of the primary closure fastener. A method of making the reclosable sack is also disclosed.

U.S. Pat. No. 3,473,589 discloses a plastic bag having a closure structure and a method for making same, the structure having a first thin inner layer of flexible plastic material with a first fastener element extending therealong formed of a resilient material and being of one piece with the layer, a second thin layer of flexibly plastic material facing the first layer and having a uniform second fastener element extending therealong formed of a resilient material and being of one piece with the second layer and shaped to be releasably interlocked with the first fastener element, a first outer layer positioned over the outer surface of the first inner layer and laminated thereto, the first inner and outer layers providing a first substantially monolithic wall so that the first inner layer provides a support with the layers coacting and allowing a stronger lock with a thin film, and a second outer layer positioned over the outer surface of the second inner layer and laminated thereto, the second inner and outer layers providing a second substantially monolithic wall so that the second inner layer provides a backing for the support allowing a stronger lock with a thin film, the outer layers laminated to the inner layer opposite fastener elements so as to reinforce the inner layers in the area of the fastener elements.

DISCLOSURE OF THE INVENTION

In accordance with the first embodiment of the present invention there is provided a reclosable bag made from plastic film having reclosable fastener assemblies thereon, film having a reclosable fastener assembly attached thereon, and a method for making reclosable bags from plastic film having reclosable fastener assemblies thereon. The reclosable bag has a reclosable fastener assembly connected to a single wall of the bag, and the film has a reclosable fastener connected to one side thereof which does not require attachment to any other portion of the film when making a bag. The fastener may have an easy bag opening tamper-proof member attached thereto to indicate if the bag has been previously opened.

The film of the invention has the advantage of having a reclosable fastener assembly completely connected thereto prior to being fed to a bag making machine or a form, fill, and seal machine, thereby eliminating the need to apply a reclosable fastener assembly during the bag making process or during the form, fill, and seal process, thereby eliminating the need for the equipment necessary to add a reclosable fastener during the form, fill, and seal process.

The film of the invention has the additional advantage of being capable of forming a reclosable bag on a vertical or horizontal form, fill, and seal machine.

The bag and film of the invention has the advantage of allowing the reclosable fastener assembly to be located at any desired distance from the top or bottom of the bag because the fastener assembly is attached to only one wall of the bag of the invention. The length of the fastener assembly may be much less than the width of a bag formed with the fastener assembly thereon. Such small length fasteners allow liquids, powders, and other small granular materials to be poured from the bag through the fastener assembly.

A good use for the bags of the invention when the ends of the fastener assembly are not sealed to front wall of the bag is to store non-perishable items such as ice glazed food products that are not susceptible to freezer burn since air and moisture is able to enter the bag around the ends of the fastener assembly after the front wall of the bag has been penetrated to gain access to the fastener assembly or even before the bag wall has been penetrated such as when a line of perforations is utilized for allowing easy access to the fastener assembly.

In accordance with the first, second and third embodiment of the present invention there is provided a method for making reclosable bags on a bag making machine where the reclosable fastener strips are independently attached to the same side of the bag film preferably transversely to the longitudinal forming axis in-line with the bag making machine, a unique two-piece interlocking fastener assembly that minimizes the size of the opening at the fastener strip ends, film having a plurality of the unique reclosable fasteners each with two interlocking profile strips attached thereon, and an apparatus for attaching the unique fastener assembly to a sheet of film including a mechanism for supplying a continuous film of flexible bag material and a mechanism for feeding preferably the coiled reclosable profile strip material preferably transversely across the bag material film, and a mechanism for positioning, cutting, and attaching enough of the reclosable profile strip material to form a preferably transversely positioned reclosable fastener for a single bag during each cycle of the apparatus, the reclosable fasteners each being spaced a single bag length apart and each profile strip of each reclosable fastener being maintained in the interlocked position and being independently connected to the same side of the film that forms one panel of the resulting bag. The bag material can be wound into a roll in the folded or unfolded state or fed directly into a conventional form, fill, and seal machine that is in-line with the apparatus for positioning and attaching the reclosable fastener strip material to the bag material web.

In accordance with a fourth embodiment of the present invention there is provided a chain of coilable interconnected reclosable bags and a method for making the same. A chain of bags are interconnected by a series of preferably transverse cross-seals including a plurality of spaced tear-lines between adjacent bags. Each bag of the coilable chain includes preferably a transversely positioned reclosable fastener secured to the outer or inner surface of material that forms its front wall. The present invention allows a single bag to be easily torn away from the chain of bags.

The method of making the chain of coilable reclosable bags includes supplying a continuous film of plastic web material and moving said film forward in a bag forming direction. A plurality of reclosable fasteners are secured to the surface of the web material, that forms the front wall of each bag, preferably transversely across the web. The web is drawn forward bringing the inside surface of said web material that forms the front wall of each bag next to the surface of a web material that forms the back wall of each bag. The longitudinal edges of the web materials that form the front and back wall of each bag are sealed together to form a tube of plastic web material.

The front wall and back wall of the tube are cross-sealed to each other to form the top and bottom end of each bag. A tearline is cut in the tube between the seals of each bag and the chain of bags are coiled into a roll. The method can include the application of a twin seal with a tearline between them thereby creating a closed top end and a closed bottom end on each bag or a single seal and tearline can be applied which creates an open end and a closed end on each bag. The method of the present invention also includes a rupturable line of weakness applied to the front wall of each bag adjacent to the reclosable fastener for entering the bag. The reclosable bags on a roll can be conveniently used by the customer. The reclosable bags of the present invention also have the unique property of being less likely to leak when the bag is placed on its back wall with the reclosable fastener facing up.

BRIEF DESCRIPTION OF THE DRAWINGS

FIG. 6E is a perspective view of an apparatus for connecting the reclosable fasteners of the invention to a sheet of film;

FIG. 6F is a cross-sectional view taken along line 6F—6F of FIG. 6E showing the fastener attaching device heat sealing the fastener to the film of the present invention;

BEST MODE FOR CARRYING OUT THE INVENTION

Figure 1:
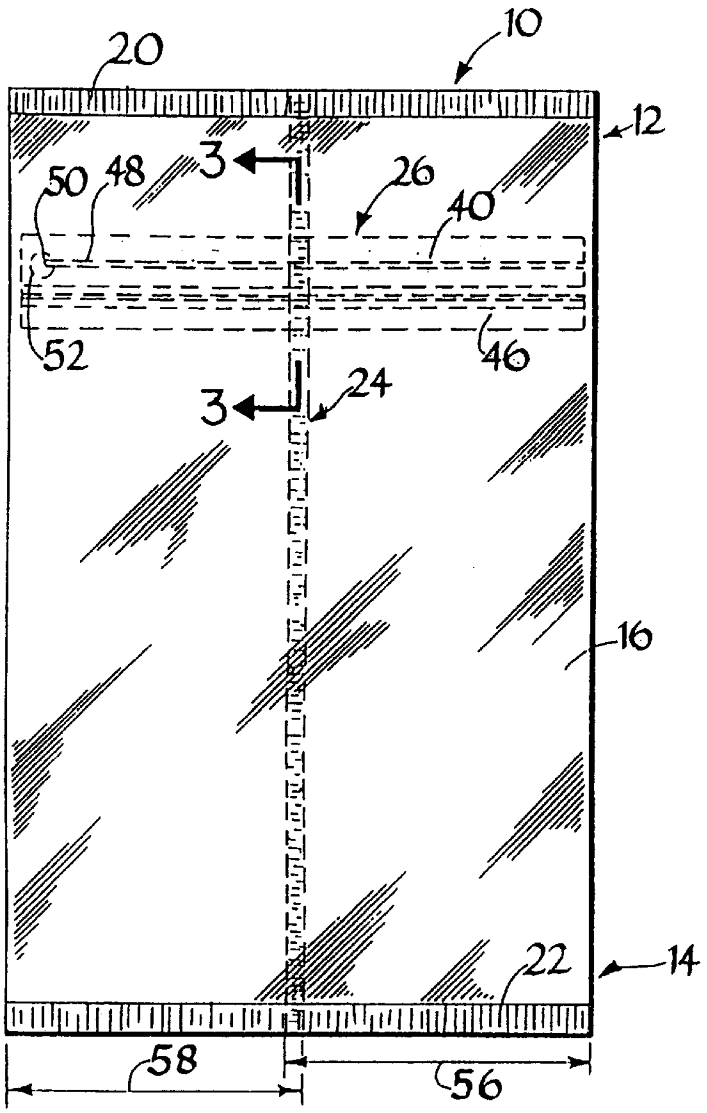
FIG. 1 is a front elevational view of the bag of the first embodiment of the present invention.
Figure 2:
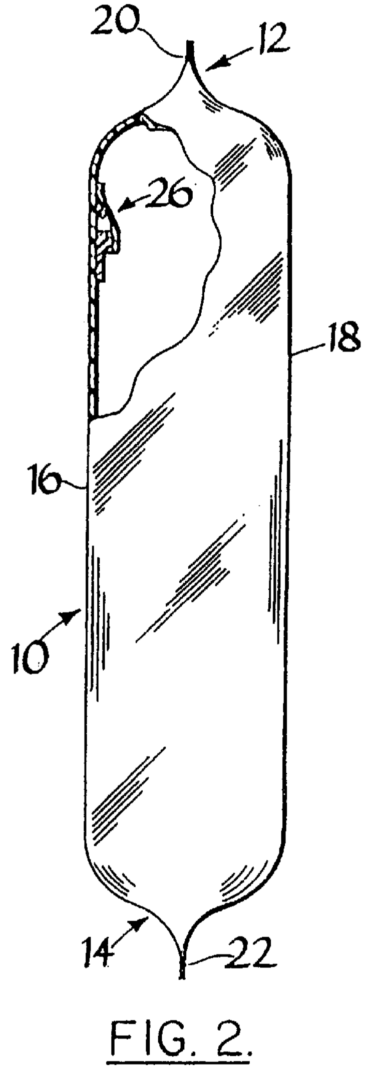
FIG. 2 is a partly cut-away, side elevational view of the bag shown in FIG. 1.
Figure 3:
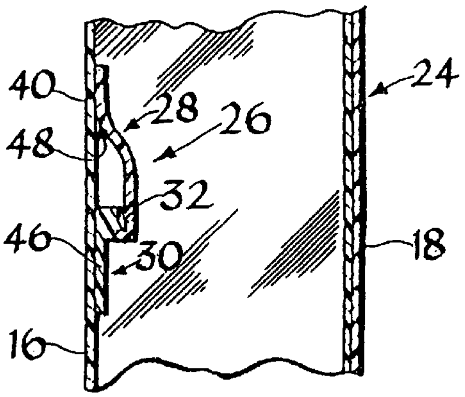
FIG. 3 is a cross-sectional view of the bag of FIG. 1 taken along lines 3—3 of FIG. 1.

Referring now to the drawings, in FIGS. 1 and 2 is shown the reclosable bag of the invention generally indicated by the numeral 10. Bag 10 has a top end generally indicated by the numeral 12 and a bottom end generally indicated by the numeral 14. Bag 10 has a front wall 16 and a back wall 18.

Bag 10 has a seal 20 at the top end 12 at which the front wall 16 is joined to the back wall 18, and a seal 22 at the bottom end at which the front wall 16 is joined to the back wall 18. Located on the back wall 18 is a seam generally indicated by the numeral 24.

Figure 5:
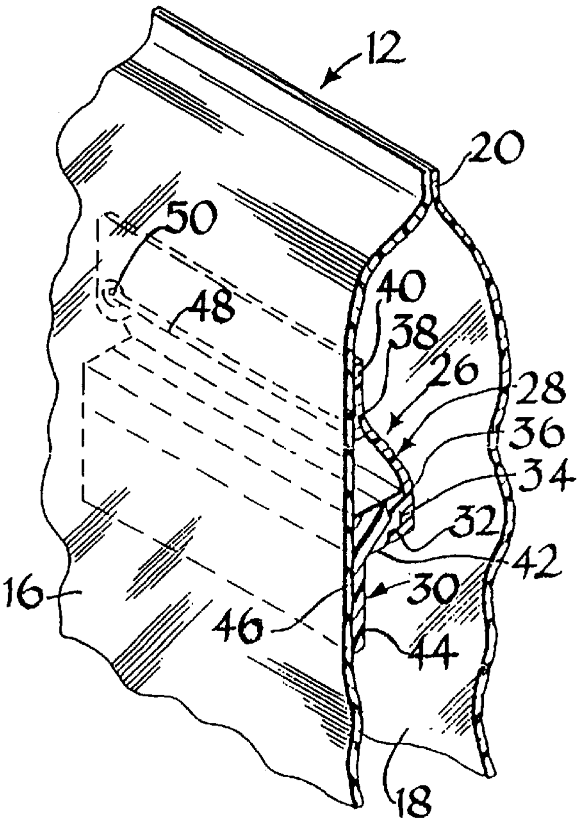
FIG. 5 is a partly cut-away, partly cross-sectional, detailed perspective view of the reclosable fastener connected to the bag of the first embodiment of the present invention.

As best can be seen in FIG. 5, connected to front wall 16 is a reclosable fastener assembly generally indicated by the numeral 26 having two opposite ends *26a* and *26b*. Reclosable fastener assembly 26 includes two profile strips generally indicated by the numerals 28 and 30 which are shown in the drawings to be interlocked. Profile strip 28 contains a groove 32 and profile strip 30 contains a protuberance 34 which is lockingly received in the groove 32.

Each end *26a* and *26b* of reclosable fastener assembly 26 is preferably sealed in any conventional manner such as heat sealing to the inside of front wall 16 to prevent air or liquids from entering or leaving bag 10 through the ends *26a* and *26b* of reclosable fastener assembly 26 after the front wall 16 has been opened by the user of the bag 10 to gain access to reclosable fastener assembly 26. However, if desired, the ends *26a* and *26b* need not be sealed to the inside of front wall 16, and after opening front wall 16, air or liquids can enter or leave bag 10 through the ends *26a* and *26b* of bag 10 and through the opening in front wall 16.

The bag 10 is air tight prior to opening the front wall 16 to gain access to reclosable fastener assembly 26. Therefore, products can be vacuum packed in bag 10.

Groove 32 is formed in groove body 36, and groove body 36 is connected to groove body arm 38. A portion of groove body arm 38 is connected to the inside of front wall 16 at seal 40. Groove body arm 38 could be made separately from groove body 36 and attached to groove body 36 in any conventional manner such as heat sealing.

Protuberance 34 is integrally connected to protuberance body 42, and protuberance body 42 is integrally connected to protuberance body leg 44. A portion of protuberance body leg 44 is connected to the inside of front wall 16 at seal 46. Protuberance body leg 44 could be made separately from protuberance body 42 and attached to protuberance body 42 in any conventional manner such as heat sealing.

A string 48 for tearing a portion of front wall 16 to expose and provide access to reclosable fastener 26 is located adjacent to the inside of front wall 16 and seal 40. String 48 has an exposed end 50 connected to pull tab 52 for grasping by the customer and pulling to tear a portion of the front wall 16 covering reclosable fastener 26. If desired, string 48 could be replaced with a plurality of perforations in front wall 16 between seal 40 and protuberance body 42. If desired, string 48 and the plurality of perforations in front wall 16 could be omitted from bag 10, and the portion of front wall 16 between seal 40 and protuberance body 42 could be opened with a sharp object such as knife or scissors.

Figure 4:
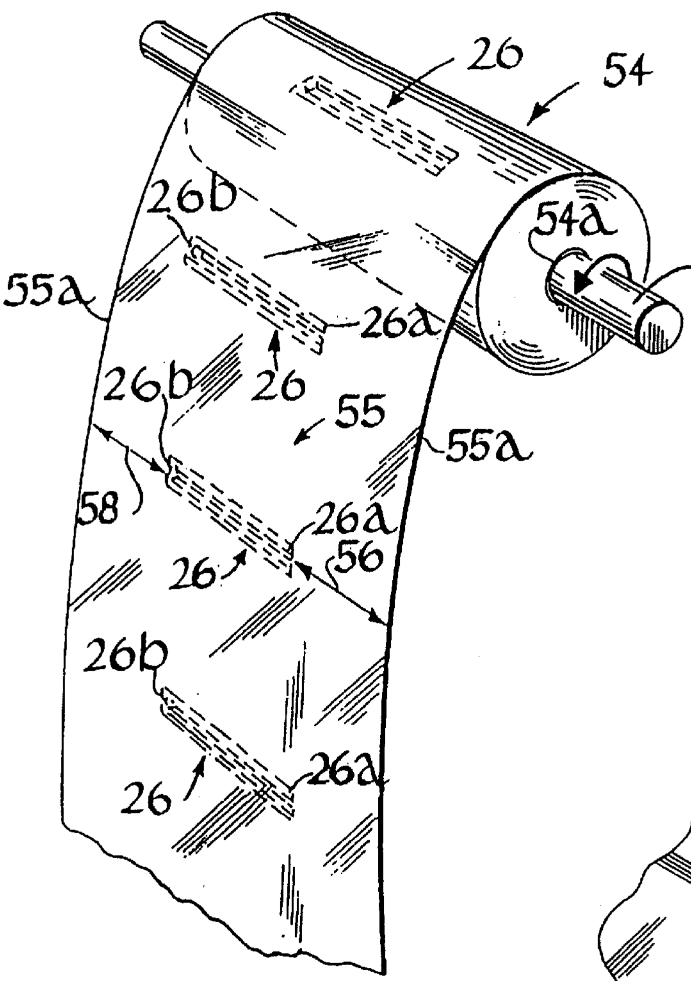
FIG. 4 is a perspective view of a roll of film of the first embodiment of the present invention having a plurality of reclosable fasteners connected thereto.

A roll of film 54 on a paper core 54*a* placed on an axle or roller 56 containing the reclosable fastener 26 is shown in FIG. 4. Film roll 54 can be prepared by connecting reclosable fastener 26 to a flat sheet of film 55 at seal 40 and 46. String 48 of reclosable fastener 26 may be connected to reclosable fastener 26 prior to attaching reclosable fastener 26 to film 55. If desired, film 55 may be perforated to allow string 48 to extend therethrough. Also, as stated above, string 48 could be eliminated and replaced with a plurality of perforations on front wall 16 to permit access to reclosable fastener 26 by tearing along the plurality of perforations. If desired, reclosable fastener 26 could be attached to film 55 parallel to the edge 55*a* of film 55, i.e., rotated 90 degrees from the orientation shown in FIG. 4 where reclosable fastener is shown in the preferred orientation perpendicular to the parallel edges 55*a* of film 55.

To make the bag 10 of the invention from the roll of film 54, each side 56 and 58 of the film 54 is folded together as shown in FIG. 1 to overlap and form seal 24. The combined length of sides 56 and 58 must be greater than the length of reclosable fastener 26 to enable seal 24 to be formed. Top seal 20 and bottom seal 22 can then be made simultaneously or in any desired order. For example, bottom seal 22 could be made first, the bag could then be filled with a product such as a food item or the like, and then the top seal 20 could be made. The roll of film 54 could be used on a conventional form, fill, and seal machine. Such machines are well known in the art. U.S. Pat. No. 4,617,683 shows a typical form, fill, and seal operation with the exception that a reclosable fastener is added, and U.S. Pat. No. 4,617,683 is hereby incorporated by reference.

Any conventional bag making film known in the art may be utilized as the film stock to make bag 10. The seals of the invention are preferably made by heat sealing as is well known in the art. Such bag film is commonly referred to as plastic film, and is commonly made from polymeric materials.

Figure 6A:
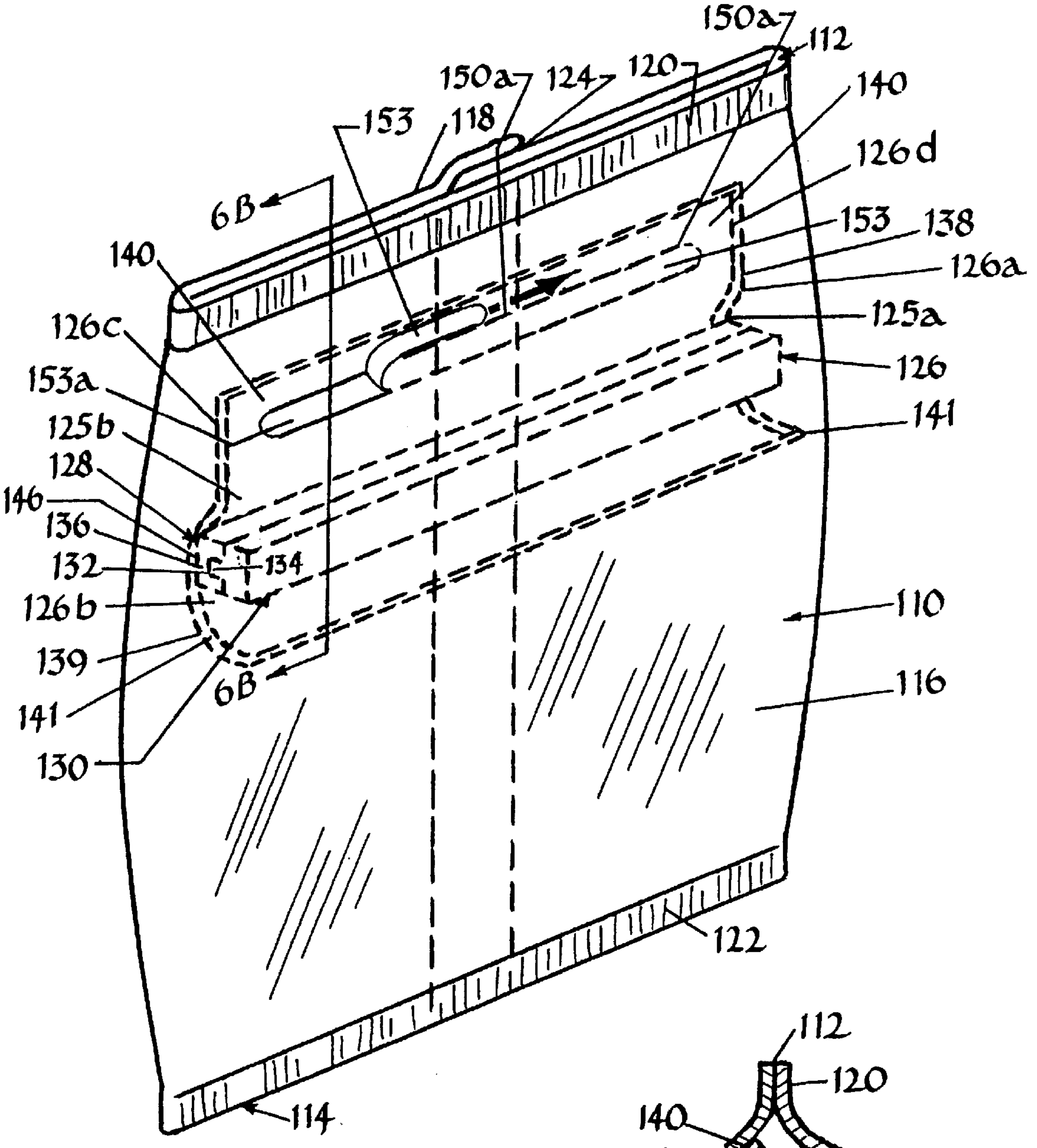
FIG. 6A is perspective view of the bag of the second embodiment of the present invention including a pull-out plug for easy opening.
Figure 6B:
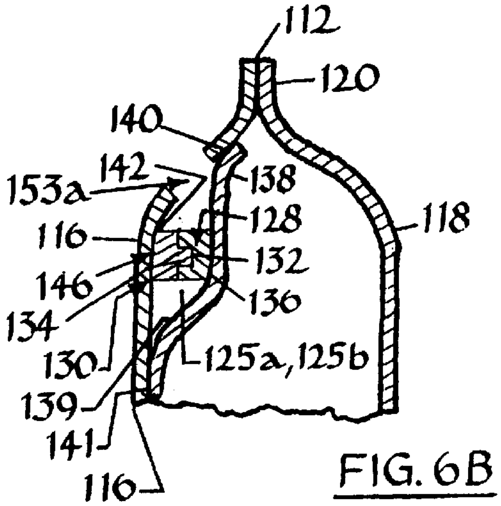
FIG. 6B is a cross-sectional view of the bag of FIG. 6A taken along lines 6B—6B of FIG. 6A.

Referring now to FIGS. 6A and 6B is shown the reclosable bag of the second embodiment of the invention generally indicated by the numeral 110. Bag 110 has a top end generally indicated by the numeral 112 and a bottom end generally indicated by the numeral 114. Bag 110 has a front wall 16 and a back wall 118.

Bag 110 has a generally horizontal seal 120 at the top end 112 at which the front wall 116 is joined to the back wall 118, and a seal 122 generally parallel to seal 120 at the bottom end at which the front wall 116 is joined to the back wall 118. Located on the back wall 118 is a seam generally indicated by the numeral 124 which is generally perpendicular to seal 120 and 122.

As can best be seen in FIG. 6A, connected to front wall 116 is a reclosable fastener assembly generally indicated by the numeral 126 having two opposite ends 126*a* and 126*b*. Reclosable fastener assembly 126 includes two fastener profile strips generally indicated by the numerals 128 and 130 which are shown in the drawings to be interlocked. Fastener profile strip 128 contains a groove 132 and fastener profile strip 130 contains a protuberance 134 which is lockingly received in the groove 132.

Groove 132 is formed into groove body 136, and groove body 136 is connected to groove body arm 138. A portion of groove body arm 138 is connected by heat-sealing or welding to the inside of front wall 116 at seal 140. As shown in FIG. 6A and FIG. 6B groove body 136 is connected to a groove body leg 139. A portion of groove body leg 139 may be connected to the inside of front wall 116 at peelable seal 141.

Peelable seals such as peelable seal 141 are well known in the art and are disclosed in U.S. Pat. No. 5,050,736, which is hereby incorporated by reference. Peelable seals such as peelable seal 141 are made to peel open easily using minimal opening forces by utilizing low sealing temperatures, reduced dwell time, and light pressures. Peelable seals can also be produced by utilizing a single polymer or from a combination of polymers that molecularly produce low seal strengths.

As can best be seen in FIG. 6B, protuberance 134 is preferably integrally connected to protuberance body 142. A portion of protuberance body 142 is connected by heat-sealing or welding to the inside of front wall 116 at seal 146.

As can be seen in FIG. 6A, an easy opening pull-out plug 150 is located on bag 110 and is defined by a plurality of perforations 150*a* in front wall 116 between seal 140 and seal 146. Pull-out plug 150 may be torn or pulled-out as indicated by the arrow in FIG. 6 to expose and provide access to reclosable fastener 126. Pull-out plug 150 is similar to the pull-out plug disclosed in U.S. Pat. No. 3,266,965, which is hereby incorporated by reference. Pull-out plug 150 has an exposed tab or end 153 connected to pull-out plug 150 for grasping by the customer and pulling in the direction indicated by the arrow in FIG. 6A to remove pull-out plug 150 and provide an opening 153*a* in the front wall 116 covering reclosable fastener 126. If desired, pull-out plug 150 could be replaced with a single line of perforations or line of weakness such as is disclosed in U.S. Pat. No. 4,401,213, which is hereby incorporated by reference. If desired, easy opening pull-out plug 150 and perforations 150*a* in front wall 116 could be omitted from bag 110, and the portion of front wall 116 between seal 140 and seal 146 could be a continuous sheet of film which could be opened with a sharp instrument such as knife or scissors. Bag 110 would be well suited for packaging perishable items such as cereal and the like since peelable seal 141 would prevent the passage of air and moisture into the bag through reclosable fastener assembly 126 when bag 110 includes an easy opening feature such as pull-out plug 150 that requires perforations to be cut through front wall 116 of bag 110.

Thus, to open a bag 110 that has been filled with a desired product such as rice, cereal meat, or the like, pull-out plug 150 is torn or pulled out as explained above to expose and provide access to reclosable fastener 126 through opening 153*a*. Profile strip 130 is then pulled away from profile strip 128, forcing peelable seal 141 away from sealing contact with the inside of front wall 116. The interior of bag 110 may then be accessed through opening 153*a,* between profile strips 128 and 130, and between front wall 116 and peelable seal 141. As mentioned above, pull-out plug 150 could be replaced with a line of perforations or line of weakness or a continuous sheet of film, and reclosable fastener assembly 126 would be accessed by tearing the line of perforations or weakness, or opening the sheet of film with a knife or scissors.

Each end 126*a* and 126*b* of reclosable fastener assembly 126 is preferably sealed at seams 126*c* and 126*d* in any conventional manner such as heat sealing to the inside of front wall 116 to prevent air or liquids from entering or leaving bag 110 through the openings 125*a* and 125*b* at ends 126*a* and 126*b* of reclosable fastener assembly 126 after the front wall 116 has been penetrated by the user of the bag 110 to gain access to reclosable fastener assembly 126. However, if desired, the openings 125*a* and 125*b* at ends 126*a* and 126*b* need not be sealed to the inside of front wall 116, and after penetrating front wall 116, air or liquids can enter or leave bag 110 through the openings 125*a* and 125*b* at ends 126*a* and 126*b* of bag 110 and through the penetrations in front wall 116.

Groove body arm 138 and groove body leg 139 could be an integral part of groove body 136 or as shown in 6B could be made separately from groove body 136 and attached to groove body 136 during a separate operation in any conventional manner such as heat sealing. Groove body arm 138 and groove body leg 139 could be opaque in color for optically identifying where one bag should end and another bag begins without having to print some type of colored identifier on the film at each bag location.

Figure 6C:
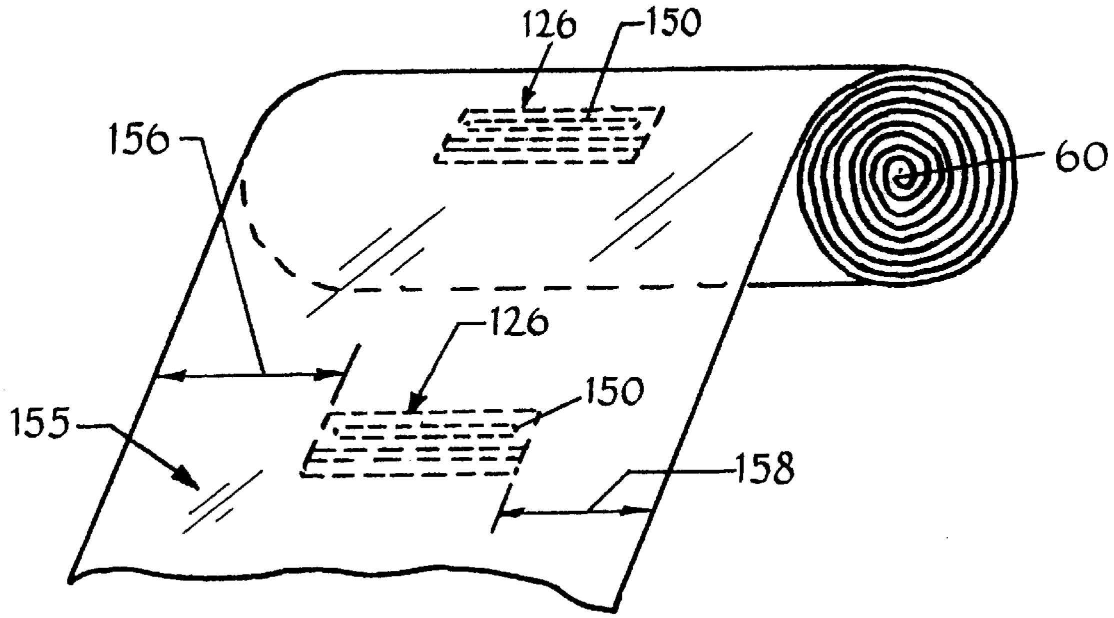
FIG. 6C is a perspective view of the film of the second embodiment of the invention wound into a coil without a supporting core.

To make the bag 110 as shown in FIG. 6A of the invention from the coil of film 60 as shown in FIG. 6C, each side 156 and 158 of the film 155 is folded together as shown in FIG. 6A to overlap and form seal 124. The combined length of sides 156 and 158 must be greater than the length of reclosable fastener 126 to enable seal 124 to be formed. Top seal 120 and bottom seal 122 can then be made simultaneously or in any desired order. For example, bottom seal 122 could be made first, the bag could then be filled with a product such as a food item or the like, and then the top seal 120 could be made. The coil of film 60 could be used on a conventional form, fill, and seal machine. Such machines are well known in the art.

Figure 6D:
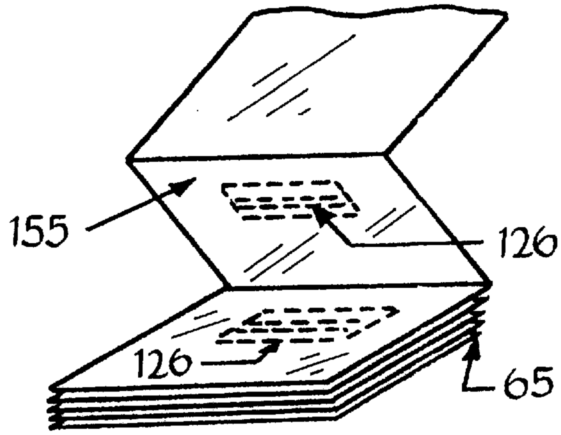
FIG. 6D is a perspective view of the film of the second embodiment of the invention staggered into a fan-folded stack.

As shown in FIG. 6C film 155 could also be wound after a plurality of reclosable fastener assemblies 126 have been attached along with a plurality of perforations, lines of weakness, or pull-out plugs into a coreless coil 60 or as shown in FIG. 6D film 155 could be formed into a fan folded stack 65 in a zig-zag fashion. Film 155 could be folded after a plurality of reclosable fasteners 126 have been attached along with a plurality of perforations, lines of weakness, or pull-out plugs 150 prior to being formed into a coil 60 or into a fan-folded stack 65.

As shown in FIG. 6E an apparatus 170 for making zippered film includes an unwinding device 175 for feeding a continuous supply of bag film 155 forwardly while attaching a plurality of two-piece reclosable fastener assemblies such as fastener assembly 126 to the inner surface of the film 155 that forms the inside of each resulting bag 110. The fastener assemblies 126 are fed laterally across the upper surface of the film 155 at right angles to the machine direction, that is, transversely to the longitudinal forming axis of the film. The fastener material 126 is supplied from a spool 171 fed through a guide slot 172 up to a stop plate 173. Stop plate 173 has a tab 173*a* connected thereto which is force fitted in slot 172*a* in the top of guide slot 172 enabling the location of stop plate 173 within guide slot 172 to be varied as desired for different fastener assembly lengths. A cut-off device 177 cuts a length of fastener material 126. Cut-off device 177 is similar to apparatus that are shown in U.S. Pat. No. 4,909,017 and U.S. Pat. No. 4,617,683. U.S. Pat. No. 4,909,017 is hereby incorporated by reference.

As can best be seen in FIG. 6F, both groove body 136 and protuberance body 142 of each reclosable fastener assembly 126 are independently connected to the film by a mechanism which includes an attaching device 179 such as that shown in U.S. Pat. No. 4,909,017 that preferably utilizes heat sealing technology. Device 179 includes a first platen 179*a* that is heated and an second platen 179*b* that could also be heated. First and second platens 179*a* and 179*b* have a device for moving the two platens together and apart such as cylinders 178*a* and 178*b* that are shown in FIG. 6E. First platen 179*b* includes guide slot 172 which extends from one end of platen 179*b* to the other end of platen 179*b* for positioning the fastener assembly 126 accurately while sealing fastener assembly 126 to film 155 to create roll of film 154. Each fastener assembly 126 is connected to the film 155 in a location that is preferably a single bag's length away from the previous fastener assembly 126.

As shown in FIG. 6E a punching mechanism 180 for providing an easy bag opening feature such as a line of perforations, or a pull-plug 150 on film 155 could be added to the apparatus for making roll of film 154. The punching mechanism 180 could consist of a single serrated blade to produce a single line of perforations in film 155 with each stroke of the mechanism 180 or as shown a serrated elongated shaped rectangular blade 181 with circular ends could be utilized to produce pull-out plug 150 in film 155 with each stroke of the mechanism 180.

Any device known in the art for providing easy opening features could be utilized. The location of the mechanism 180 for providing easy opening could be incorporated into the apparatus 170 for making roll of film 154 anywhere desirable, but the mechanism 180 would preferably be located in a place whereby the easy opening feature would be provided in or on the film 155 immediately prior to the attaching of reclosable fastener assembly 126 onto film 155.

The apparatus 170 for making rolls of film 154 includes a rewinding device 182 for winding film 155 into a roll on a supporting core 154*a* or into coil 60 without supporting core material as shown in FIG. 6C. The rewinding device 182 could be replaced by a device capable of forming film 155 into a fan folded stack 65 in a zig-zag fashion as shown in FIG. 6D.

The apparatus for making zippered film could be connected to a form, fill, and seal machine, that is, provided in-line or part of the form, fill, and seal machine. As a result the method for making bag 110 would not require that film 155 be formed into a roll of film 154 since the film 155 would be fed directly into the form, fill, and seal machine. The device 182 for rewinding the film into roll 154 would not be a required part of the apparatus for making zippered film when the in-line method is used. As a result of not having to wind film 155 into a roll 154, film 155 could have the fastener assemblies 126 attached by apparatus 170 parallel to the longitudinal forming axis of film 155 as shown in FIG. 8D rather than transversely to the longitudinal forming axis.

Any conventional bag making film known in the art may be utilized as a film stock to make bag 110. The seals of the invention are preferably made by heat sealing as is well known in the art. Such bag film is commonly referred to as plastic film, and is commonly made from polymeric materials.

Figure 7A:
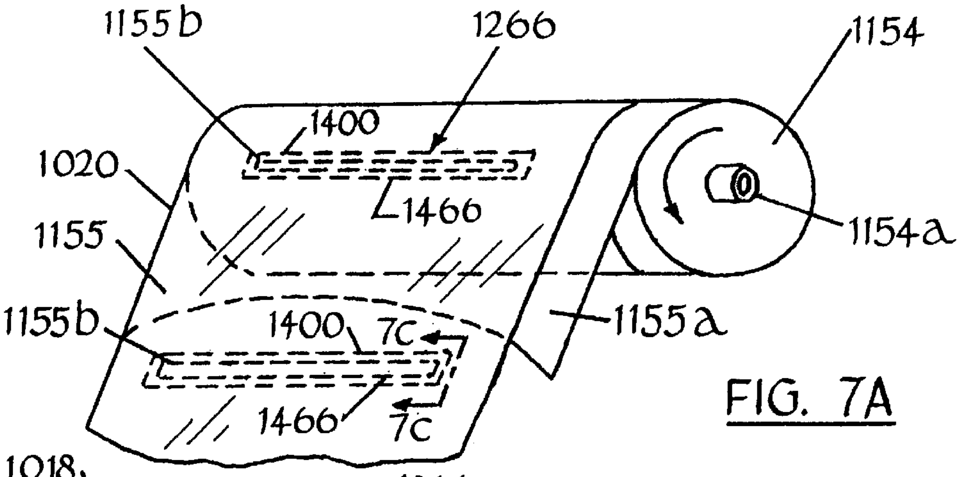
FIG. 7A is a perspective view of the roll of film of the third embodiment of the present invention having a plurality of reclosable fasteners connected onto a folded web.
Figure 7B:
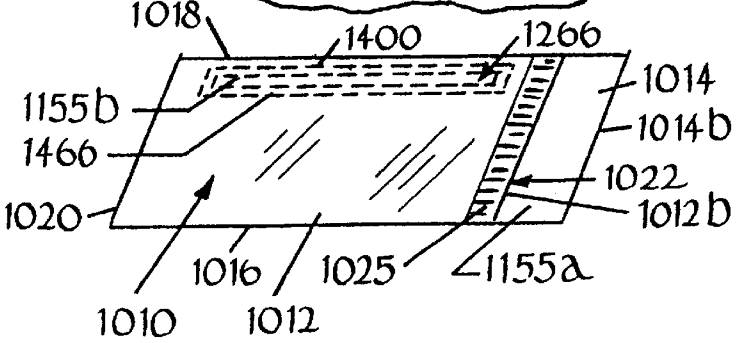
FIG. 7B is a perspective view of a bag made from the film of FIG. 7A.

In FIGS. 7A and 7B is shown an alternate embodiment of reclosable fastener assembly 126 generally indicated by the numeral 1266 connected to a sheet of film 1155. A roll of folded film 1154 on a paper core 1154*a* containing the pre-applied reclosable fastener assembly 1266 is shown in FIG. 7A. As can best be seen in FIG. 7A film roll 1154 can be prepared by connecting reclosable fastener assembly 1266 to a flat sheet of film 1155 at seal 1400 and seal 1466. A single line of perforations or line of weakness 1155*b* is provided in film 1155, such as those disclosed in U.S. Pat. No. 4,401,213, to provide access through film 1155 when reclosable fastener assembly 1266 is opened. After a plurality of reclosable fastener assemblies 1266 are connected to film 1155 and a single line of perforations or line of weakness 1155*b* are provided in film 1155, film 1155 is folded and wound on a paper core 1154*a* as shown in FIG. 7A. If desired, a pull-out plug 150 described above could be substituted for the single line of perforations or line of weakness 1155*b* in film 1155. In FIG. 7A a folded web of bag film is shown with one side longer than the other creating a lip 1155*a* which is commonly referred to in the art as J-sheeting. J-sheeting with the reclosable fastener assemblies 1266 pre-applied as shown in FIG. 7A can be formed into reclosable bags by many different bag machine types known in the art such as side-weld bag machines that are used to manufacture many different bag types such as bread bags.

Figure 7C:
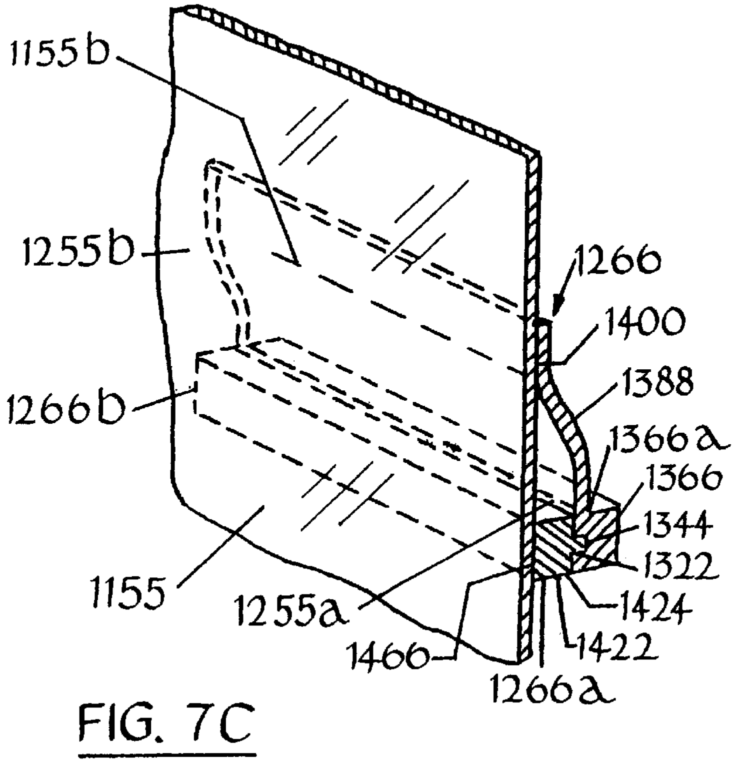
FIG. 7C is a partly cut-away, partly cross-sectional detailed perspective view taken along lines 7C—7C of FIG. 7A of a reclosable fastener of the invention connected to the film of the invention.

As can best be seen in FIG. 7C reclosable fastener assembly 1266 has groove body 1366 with groove body arm 1388 connected at the locking side 1366*a* of groove body 1366 so as to minimize the size of opening 1255*a* at fastener end 1266*a* and opening 1255*b* at fastener end 1266*b*. An arm such as 1388 is connected at the locking side of either profile strip 1366 perpendicular to the direction the protuberance 1344 of the protuberance body 1424 is lockingly received by the groove 1322 of the groove body 1366. If desired, profile strip 1366 could be interchanged with profile strip 1422 and arm 1388 could be attached to profile strip 1422 in the same manner in which arm 1388 is shown attached to profile strip 1366, and profile strip 1366 would be connected to the inside of film 1155 by heat-sealing or welding as was profile strip 1422. The profile strip including the arm 1388 of fastener 1266 needs to be the one of the two profile strips farthest from the film 1155 to which fastener assembly 1266 is connected. By reducing the size of openings 1255*a* and 1255*b* at fastener ends 1266*a* and 1266*b*, the flow of air and liquids can be minimized through the ends 1266*a* and 1266*b*.

Shown in FIG. 7B is a third embodiment of the present invention generally indicated by the numeral 1010 being formed from J-sheeted film 1155. Reclosable bag 1010 has a front wall 1012 and a rear wall 1014 which are made from a single, integral piece of plastic film. Front wall 1012 is joined to rear wall 1014 by side seams 1016 and 1018 and by bottom fold 1020. Front wall 1012 has a top edge 1012*b* which is not connected to rear wall 1014, and rear wall 1014 has a top edge 1014*b* which is not connected to front wall 1012. Top edge 1014*b* is located at a distance above top edge 1012*b* to form lip 1155*a*. Thus a mouth 1022 is formed in the top of bag 1010. Goods such as poultry, beef, or any other product to be stored in bag 1010 could be inserted into bag 1010 through mouth 1022. As shown in FIG. 7B bag 1010 includes a seam 1025 sealing off mouth 1022. Seam 1025 is normally created after bag 1010 has been filled with the goods to be stored in bag 1010. Bag 1010 has a reclosable fastener assembly 1266 connected to the inside of front wall 1012 at seal 1400 and seal 1466. Reclosable fastener assembly 1266 is positioned transversely to the longitudinal forming axis of film 1155 that forms bag 1010. Bags such as bag 1010 are commonly referred to in the art as side seal or side weld bags and are usually sold to product packers as finished bags that are often hand loaded before being sealed shut. A good use for reclosable bag 1010 would be to package bakery items such as tortillas.

Reclosable bag 1010 could be formed from J-sheeted film 1155 which includes reclosable fastener assemblies 1266 that have been attached by a machine, such as apparatus 170 shown in FIG. 6E, that is in-line with the bag forming process and therefore film 1155 would not need to be wound into roll 1154. As a result of having never to be wound into a roll 1154, as shown in FIG. 8D film 1155 could have the reclosable fastener assemblies 1266 positioned parallel to the longitudinal forming axis of film 1155 rather than positioned transversely to the longitudinal forming axis.

Figure 8A:
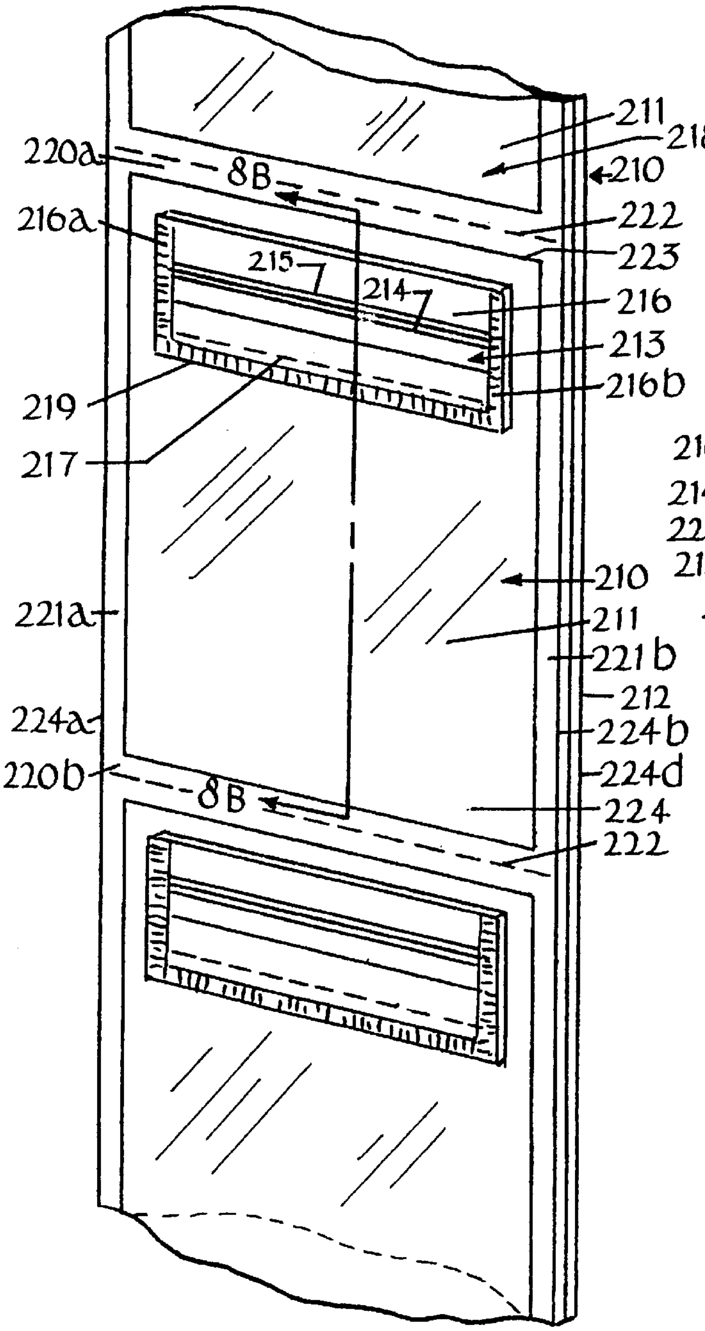
FIG. 8A is a side view of the bags of the fourth embodiment of the present invention.
Figure 8B:
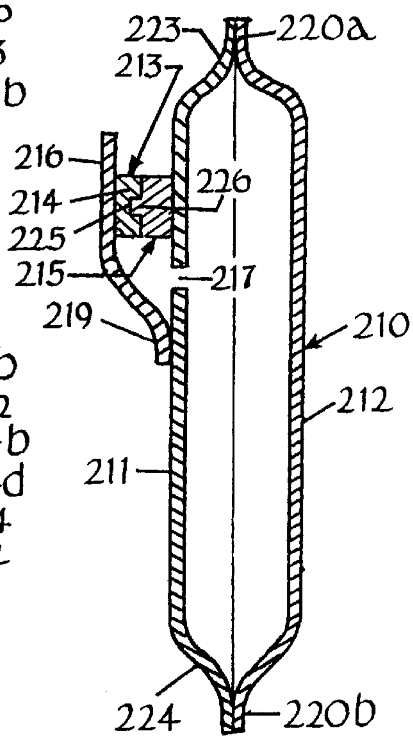
FIG. 8B is a cross-sectional view of the bag of FIG. 8A taken along lines 8B—8B of FIG. 8A.

Referring now to FIG. 8A and 8B is the fourth embodiment of the present invention showing a collapsed tubular web generally indicated by numeral 218 of plastic having a front wall 211 and a rear wall 212. The tubular web 218 includes a plurality of identical interconnected reclosable bags 210. Each bag 210 has a top end 223 and a bottom end 224. Each bag 210 has a front wall 211 and a back wall 212.

Each bag 210 has a seal 220*a* at the top end 223 and a seal 220*b* at the bottom end 224 at which the front wall 211 is joined to the back wall 212. Each bag 210 has side edge seals 221*a* and 221*b* at which the front wall 211 is joined to the back wall 212.

As can best be seen in FIG. 8B, connected to front wall 211 is a reclosable fastener generally indicated by the numeral 213. Reclosable fastener 213 includes two interlocking profile strips generally indicated by the numerals 214 and 215 which are shown in the drawings to be interlocked. Profile strip 214 contains a groove 225 and profile strip 215 contains a protuberance 226 that is lockingly received in the groove 225.

A flange 216 is connected to the outside of profile strip 214. Flange 216 is connected to front panel 211 along flange edge 219. A rupturable perforation line 217 in front wall 211 provides a tear line for tearing open to enter bag 210 once the reclosable fastener 213 is opened. Each end 216*a* and 216*b* of flange 216 is preferably secured to front wall 211 in any conventional manner such as heat sealing to the front wall 211 to prevent air or liquids from entering or leaving through flange ends 216*a* and 216*b*. However, if desired, the flange ends 216*a* and 216*b* need not be sealed to the front wall 211 so air and liquids can enter or leave bag 210 through the flange ends 216*a* and 216*b*.

The flange 216 could be integrally connected to the profile strip 214 or as shown in FIG. 8B the flange 216 could be made separately from profile strip 214 and attached to flange 216 in any conventional manner such as heat sealing.

Reclosable fastener 213 with attached flange 216 could be replaced with any of the previously described fastener arrangements such as shown in FIG. 5 which includes a groove body arm 38 and a groove body leg 44 for use in attaching reclosable fastener assembly 26 to the inside of the wall that forms the front panel of the bag instead of attaching fastener assembly 26 to the outside of the wall of the front panel of the bag as shown in FIG. 8A and 8B. Reclosable bags such as bag 210 could be used as freezer storage bags and would be very conveniently dispensed from a roll or coil rather than individual bags that are loosely packed.

The collapsed tubular web 218 or reclosable bags 210 is formed by connecting a plurality of bags 210 together by perforation lines 222 extending across the tube 218 transversely to the side edge seams 221*a* and 221*b* and between the top end seals 220*a* and bottom end seals 220*b* of two adjacent bags 210.

Figure 8C:
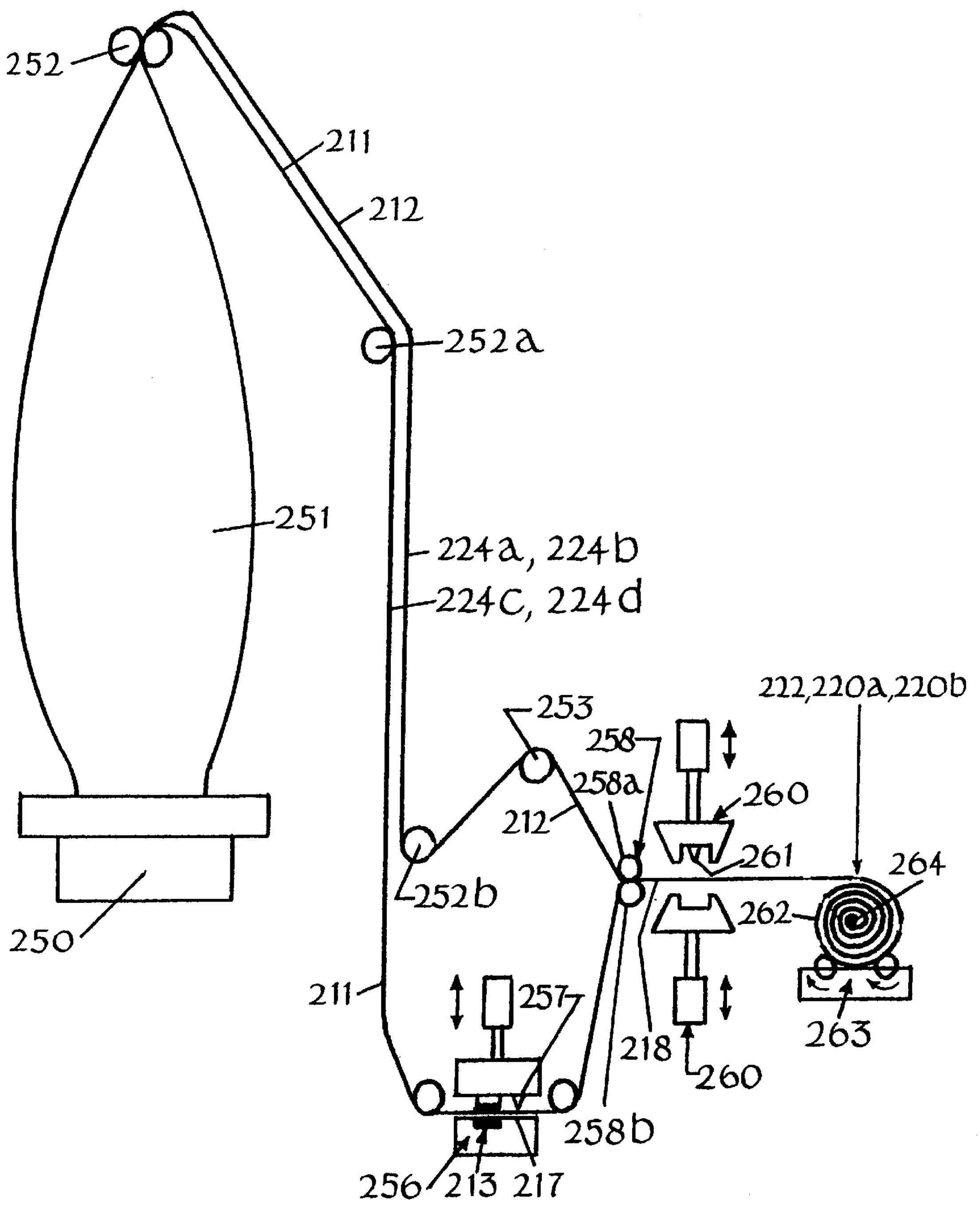
FIG. 8C is a web material flow diagram showing the method of the fourth embodiment of the present invention of converting the extruded film into reclosable bags on a roll.
Figure 8D:
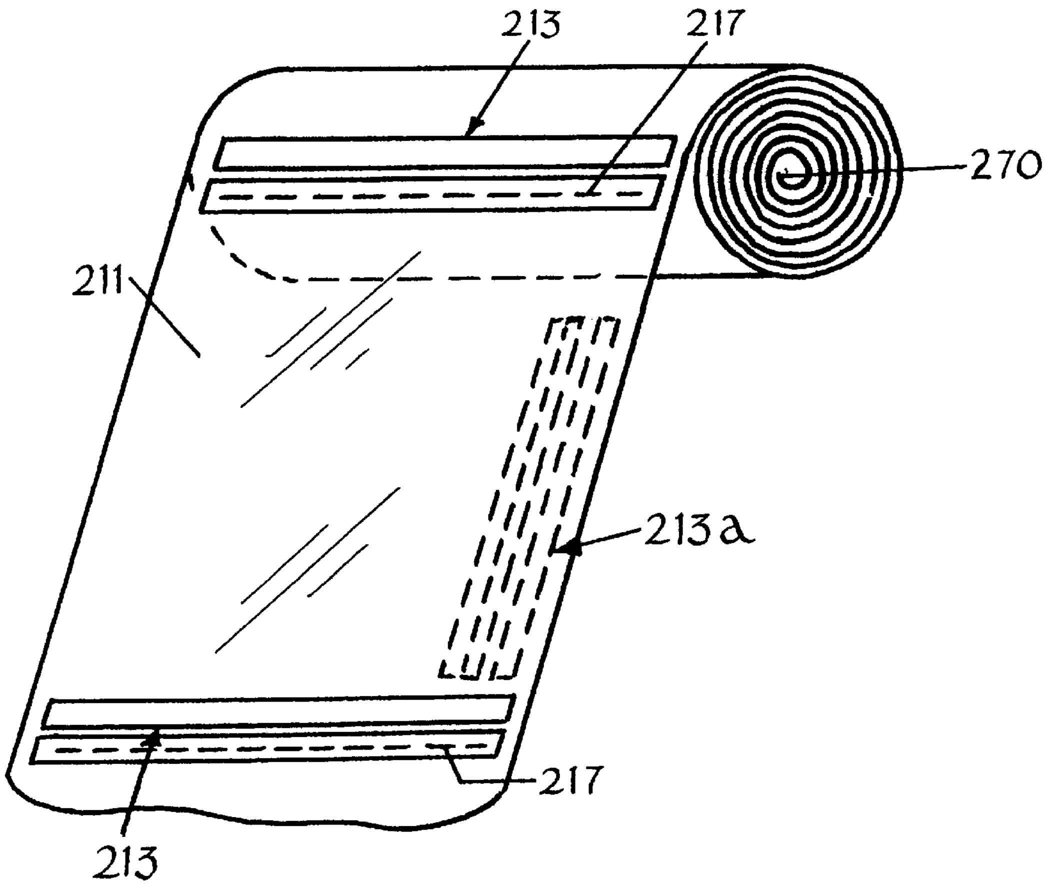
FIG. 8D is a perspective view of the front wall web material of the fourth embodiment wound into a coil.

The preferred method of producing the collapsed tubular web of reclosable bags of the present invention according to FIG. 8C requires a plastic film be blown into a tube 251 on a conventional blown film tube extrusion machine 250. Such machines are well known in the art. U.S. Pat. No. 3,543,343 shows a typical blown film tube extrusion machine with the exception that a reclosable fastener is added, and U.S. Pat. No. 3,543,343 is hereby incorporated by reference. The tube 251 is collapsed and both side edges are slit open creating two separate webs of material 211 and 212. After passing over several idler rolls such as 252*a* and 252*b*, the two webs of material 211 and 212 are forced to follow two different web paths. Web material 211 that forms the front wall travels through a sealing device 256 where a series of spaced reclosable fasteners 213 are transversely secured to the underside of the web material 211, a bag's length apart, by preferably heat sealing. Reclosable fasteners 213 are preferably only slightly shorter than the width of web material 211. Such sealing devices are well known in the art. U.S. Pat. No. 4,909,017 shows such a device. Rupturable perforation lines 217 are cut in front wall 211 adjacently below the reclosable fastener 213 by sealing device 256. A serrated knife 257 required to produce the perforation line 217 is incorporated into the typical sealing device 256.

Back wall web material 212 is diverted around sealing device 256 by passing over preferably at least one additional idler roll 253. At nip section 258 the web materials that form the front wall 211 and the back wall 212 are rejoined by passing through two preferably driven nip rolls 258*a* and 258*b* where they are secured together by continues seams along the longitudinal edges 224*a* and 224*b* of front wall 211 and the longitudinal edges 224*c* and 224*d* of back wall 212 by any conventional method such as heat sealing.

The web materials that form front wall 211 and the rear wall 212 with their peripheral edges 224*a*, 224*b* 224*c*, and 224*d*, sealed together reform a tube 218 with a plurality of spaced reclosable fasteners 213 and perforation lines 217 transversely secured a bag's length apart along the length of tube 218.

The tube 218 passes through a cutting cross-sealing device 260 that applies one bags top end seal 220*a* and the adjacent bags bottom end seal 220*b* simultaneously while cutting the perforation line 222 extending transversely across the tube 218 and between the top end seals 220*a* and bottom end seal 220*b*. Such cutting sealing devices are well known in the art. U.S. Pat. No. 4,449,962 shows a typical cutting sealing device with the exception that a straight cut is included for making separated bags. While the present invention could also produce separated bags the preferred embodiment is bags connected to one another by the perforation lines 222 between adjacent bags. The device of U.S. Pat. No. 4,449,962 could accomplish this by utilizing a serrated knife, and U.S. Pat. No. 4,449,962 is hereby incorporated by reference.

The tube 218 has been converted, as described above, into a series of reclosable bags 210 connected together making it possible to wind them into roll 262 by any conventional winding machine 263. The reclosable bags 210 can be wound onto any preferred core material 264 such as a paper tube or can be would into roll 262 without any supporting core material 264. Roll 262 can be produced with any desired number of reclosable bags 10 making up the roll 262.

Figure 8E:
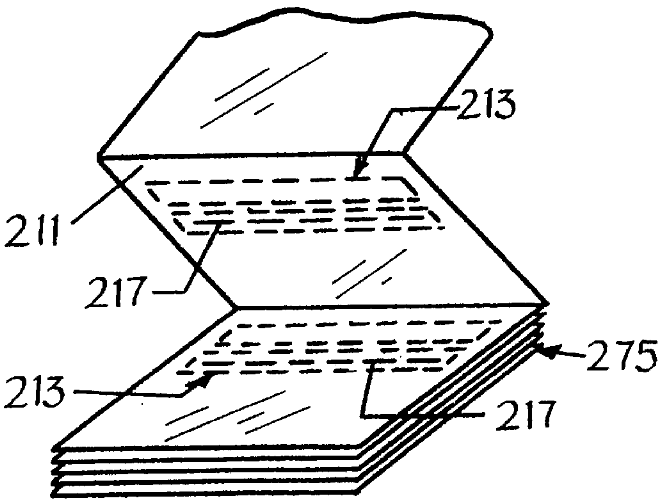
FIG. 8E is a perspective view of the front wall web material of the fourth embodiment of the invention staggered into a fan-folded stack.

As shown in FIG. 8D front wall web material 211 could be wound after a plurality of reclosable fasteners 213 have been attached along with a plurality of rupturable perforation lines 217 into a coil 270 or as shown in FIG. 8E, front wall web material 211 could be formed into a fan folded stack 275 in a zig-zag fashion. If desired, a plurality of reclosable fasteners shown in phantom lines generally indicated by the numeral 213*a* could be positioned on film 211 in a direction parallel to the longitudinal forming axis. Front wall web material 211 could also be wound into a roll on a supporting core material such as was shown in the third embodiment of the present invention. Front wall web material 211 in the roll, coiled, or fan folded state could be formed into reclosable bags during packaging operations where product is being sandwiched between front web material 211 and another web such as back wall web material 212 resulting in a bag such as reclosable bag 210 that contains product within. The packaging of products as previously described is well known in the art and a specific product that could utilize a reclosable bag formed as described would be sliced bacon.

Any conventional bag making film known in the art may be utilized as the film stock to make bag 210. Such bag film is commonly referred to as plastic film, and is commonly made from polymeric or polyolefin materials such as polyethylene. The seals and seams of the invention are preferably made by heat sealing but any other well known methods of securing polymeric materials together such as applying adhesives could also be utilized.

Although the preferred embodiments of the invention have been described in detail above, it should be understood that the invention is in no sense limited thereby. Other variations are possible. For example referring to the fourth embodiment, a single web of material could be unwound from a roll and folded, out of line with blown film tube extrusion machine 250, after the reclosable fasteners 213 have been attached and the perforated bag openings 217 have been applied. Then the side opposite the fold could be sealed closed and the remaining steps of the method of making reclosable bags on a roll according to the present invention would follow as previously described above. Also a device for staggering the bags could replace the winder so as to fan fold stack the interconnected bags into a container in a zigzag fashion versus winding them into a roll. Furthermore, the top end 223 of each bag 210 could be unsealed so the series of bags could be dispensed from the roll with one end open, allowing product to be loaded through the open end and later sealed shut by the user after loading. The rupturable line of weakness 217 could also be eliminated requiring the user to cut each bag open or a tear string could be incorporated to assist in creating an opening adjacent the reclosable profile strips 214 and 215 of each bag 210. In addition the front wall 211 could be formed from a transparent flexible film and the back wall 212 could be formed from a opaque flexible film. As taught in the fourth embodiment, many other applications could utilize a film with pre-applied reclosable fasteners that are greater than half the width of the web each located a bag length apart with each profile strip independently connected to the same side of the film,, such as, lidding films for vacuum formed trays or lidding films covering forming webs used in vacuum packaging.

Many of the elements of the various embodiments of the present invention could be interchanged with one another, e.g., the reclosable fastener assembly of the second embodiment could be substituted for the fastener assembly of the third embodiment and vice versa. The fastener assemblies of the present invention could not only be interchanged, but they could be positioned transversely or parallel to the longitudinal forming axis of the zippered film as shown in FIG. 8D. Therefore, many combinations and substitutions are possible as is made apparent from the teachings of my invention. Accordingly, the scope of my invention should be determined not by the embodiments illustrated, but by the following appended claims and their legal equivalents.

What is claimed is:

1. A film in combination with reclosable fastener assemblies for making reclosable bags, comprising:

a rectangular sheet of film having two parallel side edges and a top edge and a bottom edge, said film being maintained in a flat unfolded state and having an inside surface and an outside surface, and said inside surface creating the inside of said reclosable bags formed from said film;

a plurality of reclosable fastener assemblies each with two elongated interlocking profile strips and having two opposite ends, each of said reclosable fastener assemblies being maintained in interlocked relationship and oriented perpendicular to said side edges of said rectangular sheet of film, said fastener assemblies being positioned a single bag length apart and space beyond said ends of each said fastener assembly forming sides of said film with the combined length of said sides being greater than the length of said fastener assembly, each said fastener assembly being connected to the inside surface of said film;

each said fastener assembly having one of said profile strips defining a groove and the other of said profile strips defining a protuberance, said groove of said one profile strip being formed in a groove body and said protuberance of said other profile strip being formed in a protuberance body, said protuberance of said protuberance body being lockingly received in said groove of said groove body; and each said fastener assembly having a continuous elongated leg connected to said groove body and a continuous elongated arm connected to said protuberance body, said continuous leg extending from the side of said fastener assembly opposite said continuous arm, said continuous leg and said continuous arm being greater than the width of said bodies of each said profile strip whereby a portion of one of said arm and said leg connecting said fastener assembly to said film is spaced away from said bodies.

2. The article of claim 1, wherein said continuous leg is connected to said film by a heat seal.

3. The article of claim 2, wherein said continuous arm is connected to said film by a heat seal.

4. The article of claim 1, wherein the width of each of said continuous arm and said continuous leg is several times greater than the width of said bodies of each said fastener assembly.

5. The article of claim 1, wherein the width of said continuous arm is greater than the width of said continuous leg.

6. The article of claim 1, wherein said portion of said arm is connected to said film by a heat seal spaced away from said body a distance greater than the width of said body.

7. A film in combination with reclosable fastener assemblies for making reclosable bags on a form, fill, and seal process, comprising:

a rectangular sheet of film having two parallel side edges and a top edge and a bottom edge, one of said top edge and said bottom edge providing a trailing edge and the other of said top edge and said bottom edge providing a leading edge for said film when forming reclosable bags, said film being maintained in a flat unfolded state and having an inside surface and an outside surface, and said inside surface creating the inside of said reclosable bags formed from said film;

a plurality of reclosable fastener assemblies each with two elongated interlocking profile strips and having two opposite ends, each of said reclosable fastener assemblies being maintained in interlocked relationship and oriented perpendicular to said side edges of said rectangular sheet of film, said fastener assemblies being positioned a single bag length apart with area beyond said ends of each said fastener assembly forming substantially equal sides of said film with the combined length of said sides being greater than the length of said fastener assembly, each said fastener assembly being connected to the inside surface of said film;

each said fastener assembly having one of said profile strips defining a groove and the other of said profile strips defining a protuberance, said groove of said one profile strip being formed in a groove body and said protuberance of said other profile strip being formed in a protuberance body, said protuberance of said protuberance body being lockingly received in said groove of said groove body; and each fastener assembly having a continuous elongated leg connected to one of said groove body and said protuberance body, and a continuous elongated arm connected to the other of said groove body and said protuberance body, said continuous leg extending from the side of said fastener assembly opposite said continuous arm, said continuous leg and said continuous arm being greater than the width of said bodies of each said profile strip, each said fastener assembly being connected to said film by a portion of one of said continuous leg and said continuous arm, said one of said continuous leg and said continuous arm extending toward said leading edge and the other of said continuous leg and said continuous arm extending away from said leading edge, whereby said leading edge of said combination of said film and said fastener assemblies can be fed into a form, fill, and seal machine for making bags.

8. The article of claim 7, wherein said one of continuous leg and said continuous arm is connected to said film by a heat seal.

9. The article of claim 8, wherein the other of said continuous leg and said continuous arm is connected to said film by a heat seal.

10. The article of claim 7, wherein the width of one of said continuous arm and said continuous leg is several times greater than the width of said bodies of each said fastener assembly.

11. The article of claim 7, wherein the width of one of said continuous arm and said continuous leg is greater than the width of the other of said continuous arm and said continuous leg.

12. The article of claim 7, wherein said combination of said film and said fastener assemblies is formed as a roll.

13. A film in combination with reclosable fastener assemblies for making reclosable bags, comprising:

a rectangular sheet of film having two parallel side edges and a top edge and a bottom edge, said film being maintained in a flat unfolded state and having an inside and an outside surface, and said inside surface creating the inside of said reclosable bags formed from said film;

a plurality of reclosable fastener assemblies each with two elongated interlocking profile strips and having two opposite ends, each of said reclosable fastener assemblies being maintained in interlocked relationship and oriented perpendicular to said side edges of said rectangular sheet of film, said fastener assemblies being positioned a single bag length apart and spaced beyond said ends of each said fastener assembly forming sides of said film with the combined length of said sides being greater than the length of said fastener assembly, each said fastener assembly being connected to the inside surface of said film;

each said fastener assembly having one of said profile strips defining a groove and the other of said profile strips defining a protuberance, said groove of said one profile strip being formed in a groove body and said protuberance of said other profile strip being formed in a protuberance body, said protuberance of said protuberance body being lockingly received in said groove of said groove body; and each said fastener assembly having a continuous elongated leg and a continuous elongated arm, said continuous leg extending from the side of said fastener assembly opposite said continuous arm, said continuous leg and said continuous arm each having a width greater than the width of said bodies of each said profile strip, each of said continuous leg and said continuous arm being connected to said inside surface of said film for connecting each said fastener assembly to said film.

14. A film in combination with reclosable fastener assemblies for making reclosable bags on a form, fill, and seal process, comprising:

a rectangular sheet of film having two parallel side edges and a top edge and a bottom edge, said film being maintained in a flat unfolded state and having an inside and an outside surface, and said inside surface creating the inside of said reclosable bags formed from said film;

a plurality of reclosable fastener assemblies each with two elongated fastener strips and having two opposite ends, each of said reclosable fastener assemblies being oriented perpendicular to said side edges of said rectangular sheet of film, said fastener assemblies being positioned a single bag length apart with the area beyond said ends of each said fastener assembly forming substantially equal sides of said film with the combined length of said sides being greater than the length of said fastener assembly, each said fastener assembly being connected to the inside surface of said film; and each said fastener strip having an elongated fastener body portion, each said fastener assembly having said bodies maintained in a fastened together relationship, one of said fastener strips having a continuous elongated leg portion connected to its body portion and the other of said fastener strips having a continuous elongated arm portion connected to its body portion, said continuous leg portion extending from the side of said fastener assembly opposite said continuous arm portion, said continuous leg portion and said continuous arm portion being greater than the width of said body portions of each said fastener strip, said fastener assembly being connected to said film in an orientation whereby one of said arm portion and said leg portion extends toward said top edge and the other of said arm portion and said leg portion extends away from said top edge of said film, a portion of one of said arm portion and said leg portion connecting said fastener assembly to said film being spaced away from said body portion.

15. The article of claim 14, wherein said continuous leg portion is connected to said film by a heat seal.

16. The article of claim 14, wherein said continuous arm portion is connected to said film by a heat seal.

17. The article of claim 14, wherein one of said fastener body portions defines at least one elongated groove while the other of said fastener body portions defines at least one protuberance.

18. The article of claim 14, wherein the width of said continuous arm portion is greater than the width of said continuous leg portion.

19. The article of claim 14, wherein:

said film in combination with said reclosable fastener assemblies is wound in a roll.

* * * * *